(12) United States Patent
De Luca

(10) Patent No.: US 10,447,498 B2
(45) Date of Patent: Oct. 15, 2019

(54) FACILITATING COMMUNICATIONS BETWEEN VIRTUAL PRIVATE CLOUDS HOSTED BY DIFFERENT CLOUD PROVIDERS

(71) Applicant: Zendesk, Inc., San Francisco, CA (US)

(72) Inventor: Vicente De Luca, San Leandro, CA (US)

(73) Assignee: Zendesk, Inc., San Francisco, CA (US)

( * ) Notice: Subject to any disclaimer, the term of this patent is extended or adjusted under 35 U.S.C. 154(b) by 81 days.

(21) Appl. No.: 15/727,106

(22) Filed: Oct. 6, 2017

(65) Prior Publication Data

US 2019/0109729 A1 Apr. 11, 2019

(51) Int. Cl.

| | | |
|---|---|---|
| *H04L 12/46* | (2006.01) | |
| *H04L 12/24* | (2006.01) | |
| *H04L 12/58* | (2006.01) | |
| *H04L 12/701* | (2013.01) | |
| *H04L 12/803* | (2013.01) | |
| *H04L 29/06* | (2006.01) | |
| *H04L 29/08* | (2006.01) | |

(52) U.S. Cl.
CPC ...... *H04L 12/4633* (2013.01); *H04L 41/0896* (2013.01); *H04L 45/00* (2013.01); *H04L 47/125* (2013.01); *H04L 63/029* (2013.01); *H04L 63/0272* (2013.01); *H04L 12/4641* (2013.01); *H04L 63/164* (2013.01); *H04L 67/10* (2013.01); *H04L 67/1097* (2013.01)

(58) Field of Classification Search
CPC ............. H04L 12/4633; H04L 41/0896; H04L 63/029; H04L 47/125; H04L 63/0272; H04L 67/1097; H04L 12/4641
See application file for complete search history.

(56) References Cited

U.S. PATENT DOCUMENTS

| | | | | |
|---|---|---|---|---|
| 7,848,335 B1* | 12/2010 | Kang | .................. | H04L 12/4633 370/401 |
| 2007/0206597 A1* | 9/2007 | Asati | .................... | H04L 12/4633 370/392 |
| 2009/0097417 A1* | 4/2009 | Asati | ....................... | H04L 45/00 370/255 |
| 2012/0076048 A1* | 3/2012 | Kanekar | ............. | H04L 12/4641 370/254 |
| 2013/0136138 A1* | 5/2013 | Miller | .................... | H04L 67/14 370/395.53 |

(Continued)

*Primary Examiner* — Kiet Tang
(74) *Attorney, Agent, or Firm* — Park, Vaughan, Fleming & Dowler LLP

(57) ABSTRACT

The disclosed embodiments relate to a system that facilitates communication between virtual private clouds (VPCs) hosted by different cloud service providers. During operation, the system receives a packet from a source at a first router in a first VPC, wherein the first VPC is hosted by a first cloud service provider, and wherein the packet is directed to a destination in a second VPC, which is hosted by a second cloud service provider. If no direct tunnel exists between the first VPC and the second VPC, the system forwards the packet through an intermediate hub to the second VPC, and automatically builds a direct tunnel from the first router in the first VPC to a second router in the second VPC to facilitate subsequent communications between the first and second VPCs.

33 Claims, 9 Drawing Sheets

(56) References Cited

U.S. PATENT DOCUMENTS

| | | | |
|---|---|---|---|
| 2013/0244614 A1* | 9/2013 | Santamaria | H04L 51/04 |
| | | | 455/411 |
| 2014/0059200 A1* | 2/2014 | Nguyen | H04L 43/026 |
| | | | 709/224 |
| 2016/0036728 A1* | 2/2016 | Duda | H04L 12/4633 |
| | | | 370/357 |
| 2016/0294731 A1* | 10/2016 | McDaniel | H04L 41/0806 |
| 2018/0302490 A1* | 10/2018 | Surcouf | H04L 67/2842 |
| 2018/0359162 A1* | 12/2018 | Savov | H04L 41/5051 |

* cited by examiner

FACILITATING COMMUNICATIONS BETWEEN VIRTUAL PRIVATE CLOUDS HOSTED BY DIFFERENT CLOUD PROVIDERS

BACKGROUND

Field

The disclosed embodiments generally relate to cloud computing systems. More specifically, the disclosed embodiments relate to the design of a system that facilitates communications between virtual private clouds (VPCs) hosted by different cloud service providers.

Related Art

As the Internet continues to evolve, organizations are beginning to move much of their computing infrastructure onto third-party cloud platforms, such as Amazon Web Services™ (AWS) and the Google Cloud Platform™ (GCP). Moving computational resources onto third-party cloud platforms provides a number of advantages. Such cloud platforms enable cloud computing resources to be rapidly provisioned with relatively minimal management effort. This allows organizations to get their applications up and running faster, with improved manageability and less maintenance. Moreover, cloud computing platforms enable organizations to rapidly adjust the size of their pool of computational resources to meet fluctuating and unpredictable business demands.

Large organizations often make use of multiple cloud platforms, which are operated by different companies, to host different computational resources. This is because a large organization may have a number of different business units, and different cloud platforms may be better suited to handle the different requirements for the different business units. Also, using multiple cloud platforms increases redundancy, and can thereby ensure against situations where an individual cloud platform fails.

However, using multiple cloud platforms creates a number of challenges. In particular, in order to provide an acceptable level of performance, it is desirable to provide "full mesh connectivity" between various computational resources in an organization. This can be a challenge because it is often hard to establish direct links between computational resources hosted on different cloud platforms. Note that the process of setting up such direct links between cloud platforms is presently performed through a time-consuming manual process.

Hence, what is needed is a technique for facilitating the establishment of direct links between computational resources hosted by different cloud providers.

SUMMARY

The disclosed embodiments relate to a system that facilitates communication between virtual private clouds (VPCs) hosted by different cloud service providers. During operation, the system receives a packet from a source at a first router in a first VPC, wherein the first VPC is hosted by a first cloud service provider, and wherein the packet is directed to a destination in a second VPC, which is hosted by a second cloud service provider. If no direct tunnel exists between the first VPC and the second VPC, the system forwards the packet through an intermediate hub to the second VPC, and automatically builds a direct tunnel from the first router in the first VPC to a second router in the second VPC to facilitate subsequent communications between the first and second VPCs.

In some embodiments, automatically building the direct tunnel from the first VPC to the second VPC involves automatically determining a direct route from the first VPC to the second VPC, and then injecting the direct route into a routing table in the first router.

In some embodiments, the operations of determining and injecting the direct route are performed by a script executing on a virtual machine located in the first VPC.

In some embodiments, injecting the direct route into the routing table in the first router involves performing an application-programming interface (API) call through an API provided by the first cloud service provider to perform the injection.

In some embodiments, automatically building the direct tunnel involves automatically building an encrypted Internet protocol security (IPSec) tunnel between the first router in the first VPC and the second router in the second VPC.

In some embodiments, the process of automatically building the direct tunnel from the first VPC to the second VPC is triggered by the intermediate hub, which sends a next-hop-resolution-protocol (NHRP) request to the first router.

In some embodiments, upon detecting a new VPC, the system: initializes two router instances for the new VPC; builds direct tunnels from the two router instances to existing dynamic multiport virtual private network (DMVPN) hubs; uses a routing protocol to identify peers for the two router instances and to determine routes to the peers; and injects the routes obtained from the routing protocol into one or more routing tables for the new VPC.

In some embodiments, when one of the two router instances fails, the system fails-over processes from the failed router instance to a remaining router instance.

In some embodiments, the routing protocol comprises the border gateway protocol (BGP).

In some embodiments, determining the routes to the peers additionally comprises using an equal-cost multipath (ECMP) routing mechanism to determine the routes.

In some embodiments, determining the routes to the peers additionally comprises using a traffic-engineering technique, which load-balances routes between the two router instances, to determine the routes.

In some embodiments, determining the routes to the peers additionally comprises using a Kubernetes pods routing mechanism to determine the routes.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
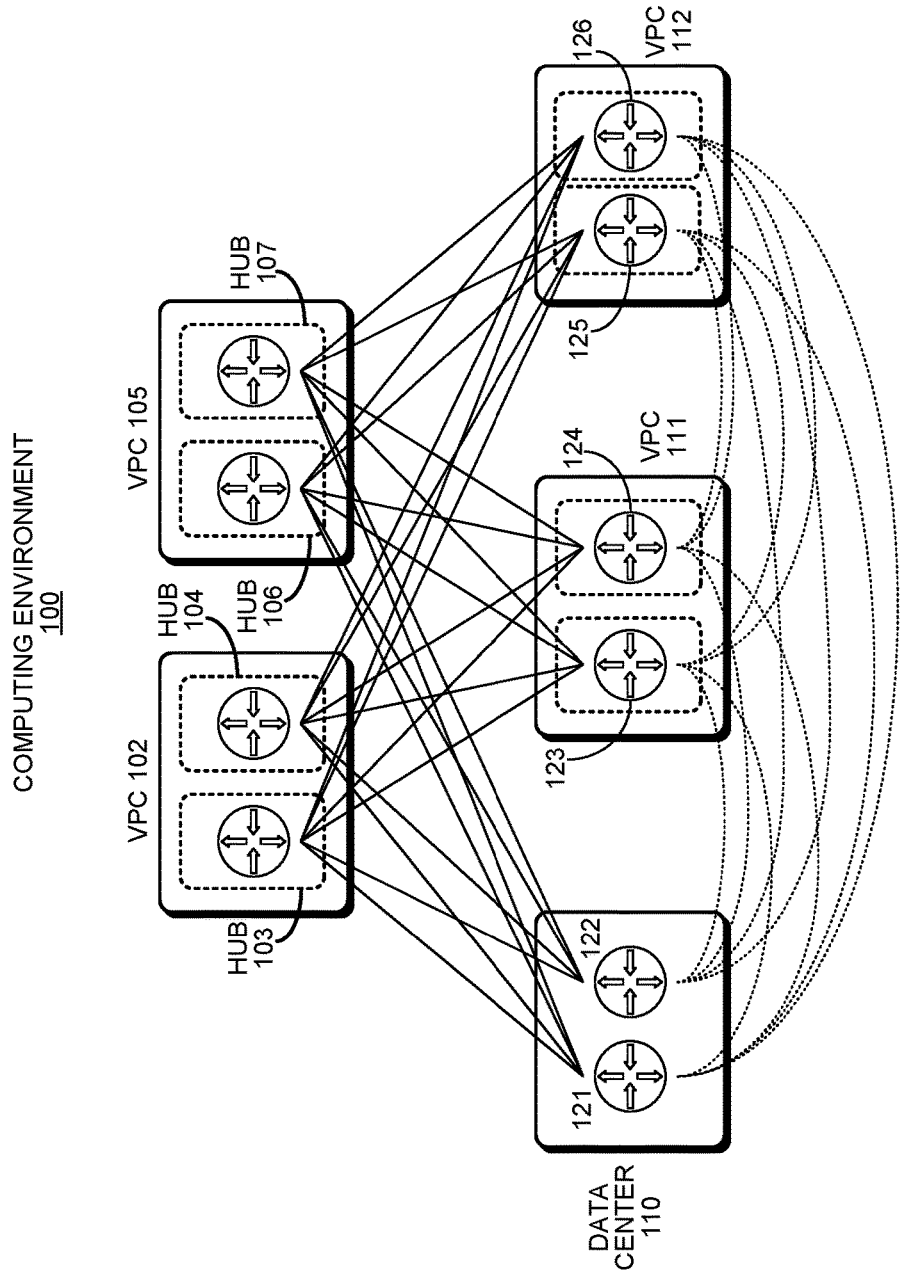
FIG. 1 illustrates a computing environment including various VPCs and routers in accordance with the disclosed embodiments.

FIG. 1 illustrates an exemplary computing environment 100 including data centers, VPCs and associated routers in accordance with the disclosed embodiments. Computing environment 100 includes four network hubs 103, 104, 106 and 107, wherein hubs 103-104 are located in VPC 102 and hubs 106-107 are located in VPC 105. These four hubs 103, 104, 106 and 107 communicate with routers 121-126 located in VPCs 111 and 112 and in data center 110. Note that hubs 103, 104, 106 and 107 and routers 121-126 communicate with each other through a DMVPN (not shown). Note that exemplary computing environment 100 is merely provided as a simple example. Typical implementations of such computing environments generally contain many more hubs, routers, VPCs and data centers than are illustrated in the exemplary system shown in FIG. 1.

Each of the routers 121-126 is initially connected through a secure IPSec tunnel to each of the hubs 103, 104, 106 and 107 as is illustrated by the solid lines in FIG. 1. These types of connections between hubs and routers are referred to as "hub-to-spoke connections." Also, during operation of the system, a number of direct connections can be dynamically established to connect routers 121-126 with each other as is illustrated by the dashed lines that appear in FIG. 1. These types of connections between routers are referred to as "spoke-to-spoke connections." The process of dynamically establishing such spoke-to-spoke connections is described in more detail below.

Note that the VPCs 102, 105, 111 and 112 in computing environment 100 can be hosted by different cloud service providers. For example, VPC 111 may be hosted by Amazon Web Services™ (AWS), whereas VPC 112 may be hosted on the Google Cloud Platform™ (GCP). As mentioned above, organizations often make use of multiple cloud platforms to host different computational resources because different cloud platforms may be better suited for different business requirements. Also, using multiple cloud platforms increases redundancy, and can thereby ensure against situations where an individual cloud platform fails.

As noted above, the use of different cloud platforms complicates the process of establishing direct links between computational resources hosted on the different cloud platforms because each different cloud platform has its own specific structure and its own API. The process of automatically setting up such direct links across different cloud platforms is described in more detail below.

Control Mechanisms Inside a VPC

Figure 2:
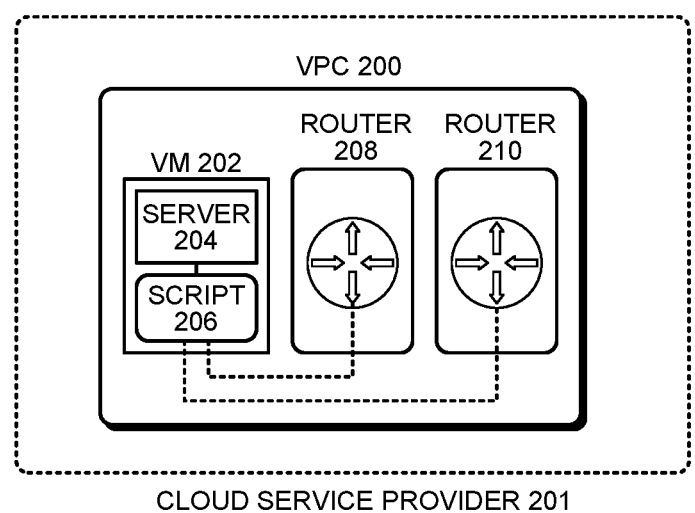
FIG. 2 illustrates control mechanisms within a VPC in accordance with the disclosed embodiments.

The above-described system for managing communication links between routers can be controlled by setting up a virtual machine (VM) 202 inside of each VPC, such as VPC 200 illustrated in FIG. 2. VM 202 provides a server 204, which executes a script 206 (or alternatively program code) that makes a series of API calls to control various operations within routers 208 and 210 within VPC 200. Note that these API calls are made through an API provided by a cloud service provider 201, which hosts VPC 200. Because such API calls are specific to each cloud service provider, a different cloud-service-provider-specific script (or portion of a script) must be executed for each different cloud service provider that is supported by the system. The operations that are triggered by these scripts are described in more detail below with reference to the flow charts that appear in FIGS. 3-5.

By installing such control mechanisms comprising a virtual machine or process that executes a script or program code within each VPC or data center, the above-described system can be easily deployed across a system that spans multiple cloud platforms. However, note that the script or program code must be customized to make cloud-service-provider-specific API calls to control each different type of cloud platform. Once these control mechanisms are installed, the system is able to automatically establish direct links between routers in response to packets being forwarded between the routers.

Initializing Router Instances

Figure 3:
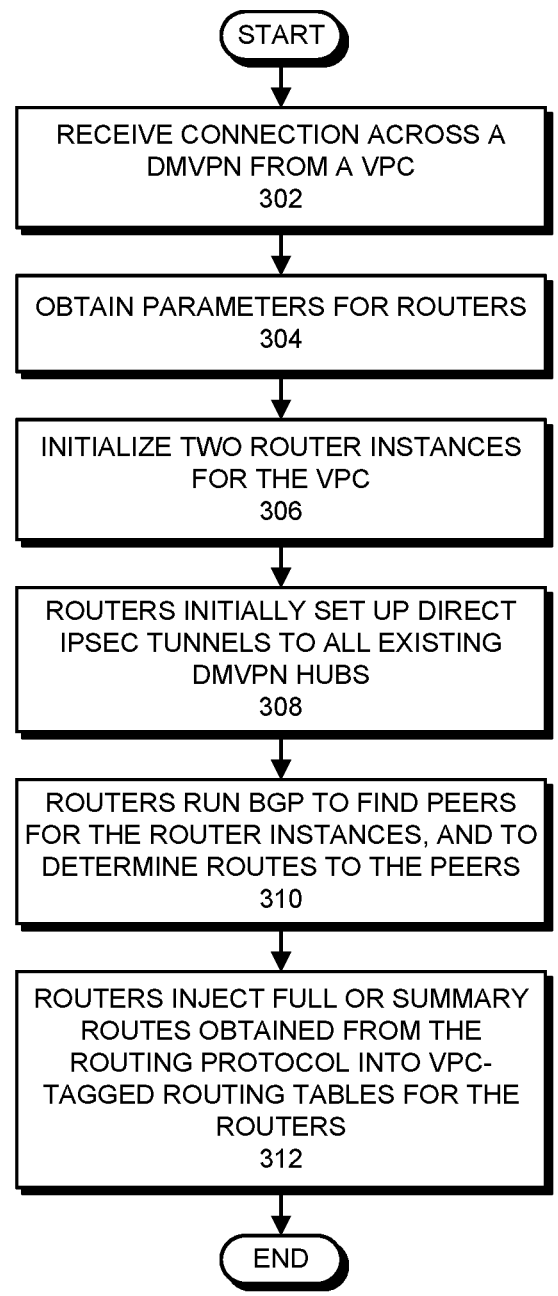
FIG. 3 presents a flow chart illustrating the process of initializing a pair of router instances for a VPC in accordance with the disclosed embodiments.

FIG. 3 presents a flow chart illustrating the process of initializing a pair of router instances for a VPC in accordance with the disclosed embodiments. At the start of this process, the system receives a connection across a DMVPN from a VPC (step 302). Next, the system obtains a number of parameters for the routers (step 304), wherein these parameters can be obtained from a configuration file or from a user, and wherein the parameters can, for example, specify: a router name, region data, IP CIDR blocks and subnets. The system then uses these parameters to initialize the two router instances for the VPC (step 306).

After the routers are initialized, the routers set up direct IPSec tunnels to all existing DMVPN hubs (step 308). Next, the routers run the BGP routing protocol to find peers for the router instances, and to determine routes to the peers (step 310). (BGP is a standardized exterior gateway protocol designed to exchange routing and reachability information among a number of systems on the Internet.) Finally, the routers inject full or summary routes obtained from the routing protocol into VPC-tagged routing tables for the routers (step 312).

Enabling a Spoke-to-Spoke Forward

Figure 4:
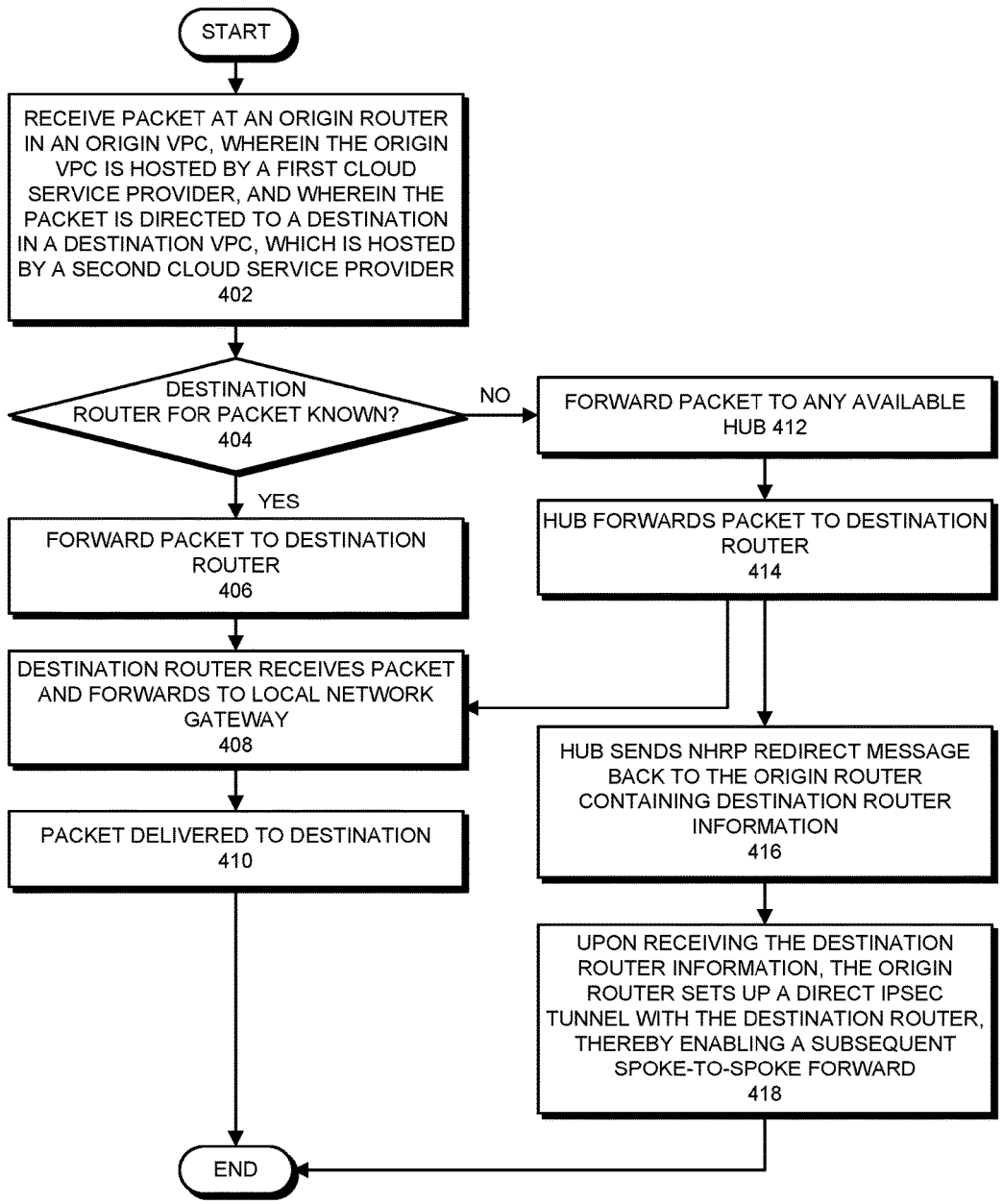
FIG. 4 presents a flow chart illustrating the process of automatically setting up a direct tunnel to facilitate a subsequent spoke-to-spoke forward in accordance with the disclosed embodiments.

FIG. 4 presents a flow chart illustrating the process of automatically setting up a direct tunnel to facilitate a subsequent spoke-to-spoke forward in accordance with the disclosed embodiments. During operation, the system receives a packet at a source router located in a source VPC, which is hosted by a first cloud service provider, wherein the packet is directed to a destination in a destination VPC, which is hosted by a second cloud service provider (step 402). Next, the system determines whether a destination router for the packet is known (step 404); this can involve looking up the destination address in a local routing table. If the destination router for the packet is known (YES at step 404), the system forwards the packet directly to the destination router (step 406). Next, the destination router receives the packet and forwards the packet to the local gateway network (step 408). The packet is then delivered to the destination (step 410).

On the other hand, if the destination router for the packet is not known (NO at step 404), the system forwards the packet to any available hub (step 412), and the hub forwards the packet to the destination router (step 414). The hub also sends an NHRP redirect message back to the origin router containing destination router information (step 416). Upon receiving the destination router information, the origin router sets up a direct IPSec tunnel with the destination router, thereby enabling a subsequent spoke-to-spoke forward (step 418).

Router Failure

Figure 5:
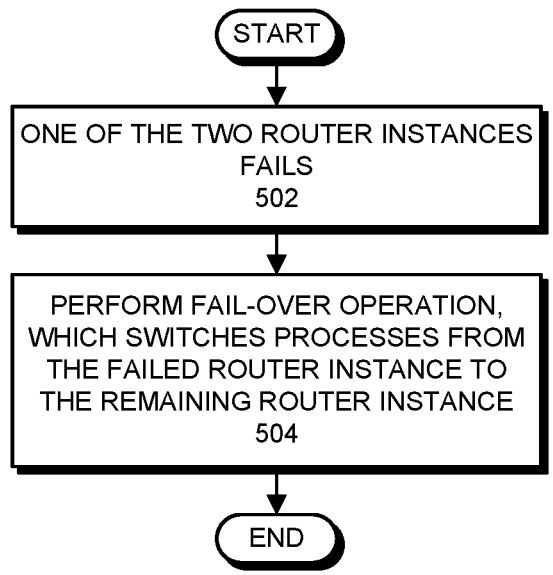
FIG. 5 presents a flow chart illustrating the process of "failing-over" a router in accordance with the disclosed embodiments.

By initializing two router instances for each VPC, the system is able to provide a "fail-over" mechanism to enable operations on a failed router to continue executing on the remaining router instance. More specifically, FIG. 5 presents a flow chart illustrating the process of "failing-over" from a failed router in accordance with the disclosed embodiments. At the start of this process, one of the two router instances in a pair of router instances fails (step 502). In response to detecting this failure, the system performs a fail-over operation, which switches processes from the failed router instance to the remaining router instance of the pair (step 504).

Traffic-Engineering Technique

In some embodiments, instead of using the ECMP technique, the system uses a traffic-engineering technique to load-balance routes between the two router instances. In an exemplary embodiment, the system implements this traffic-engineering technique by using Python code to manipulate routing tables through cloud-service-provider-specific API calls as follows.

Figure 6:
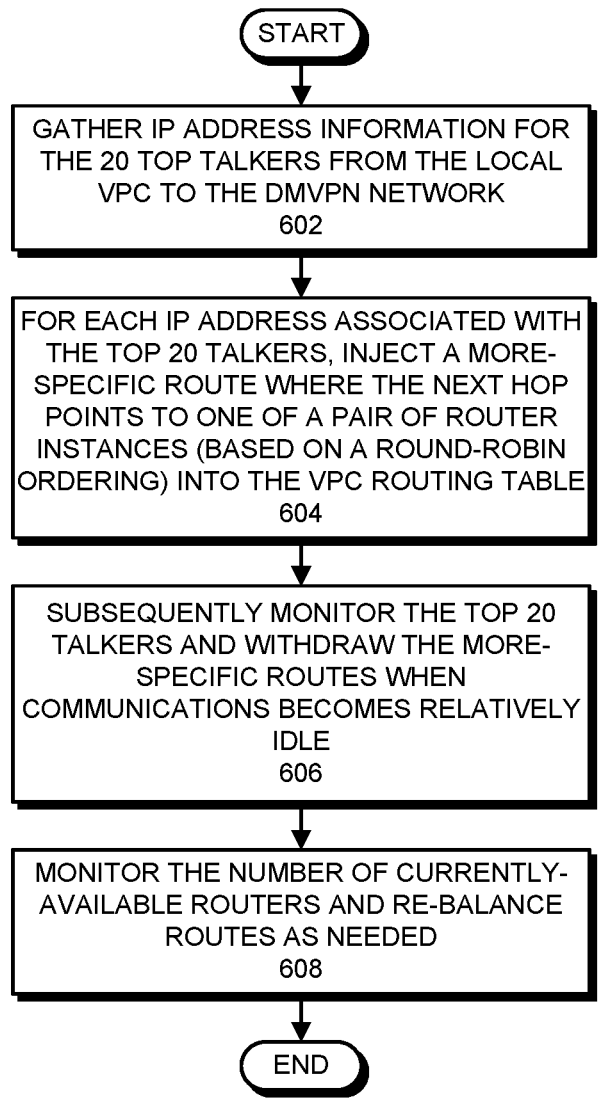

Referring the flow chart illustrated in FIG. 6, the system first gathers IP address information for the 20 top talkers from the local VPC to the DMVPN network (step 602). Next, for each IP address associated with the top 20 talkers, the system injects a more-specific route where the next hop points to one of a pair of router instances (based on a round-robin ordering) into the VPC routing table (step 604). Going forward, the system subsequently monitors the 20 top talkers and withdraws more-specific routes when communications becomes relatively idle (step 606). The system also monitors the number of currently-available routers and re-balances routes as needed (step 608).

For example, suppose we have an Amazon AWS™ VPC with a pair of router instances A and B and the top five destination talker IP addresses are as follows:
192.168.0.10
192.168.0.11
192.168.0.12
192.168.0.13
192.168.0.14

In this case, the system injects the following into the VPC routing table:
192.168.0.10==via==>Router instance A
192.168.0.11==via==>Router instance B
192.168.0.12==via==>Router instance A
192.168.0.13==via==>Router instance B
192.168.0.14==via==>Router instance A Note that the above described traffic-engineering technique ensures upload traffic will exit the VPC using the two available routers (active/active) in a load-balanced manner, thereby allowing the system to increase traffic in connections and/or packets-per-second.

Forming Connections

Figure 7A:
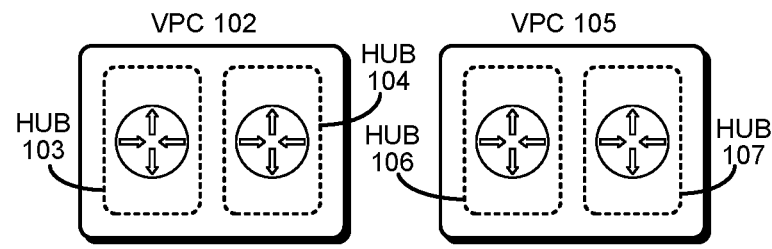
FIGS. 7A-7E illustrate how connections are formed between hubs and routers in an exemplary computing environment in accordance with the disclosed embodiments.
Figure 7B:
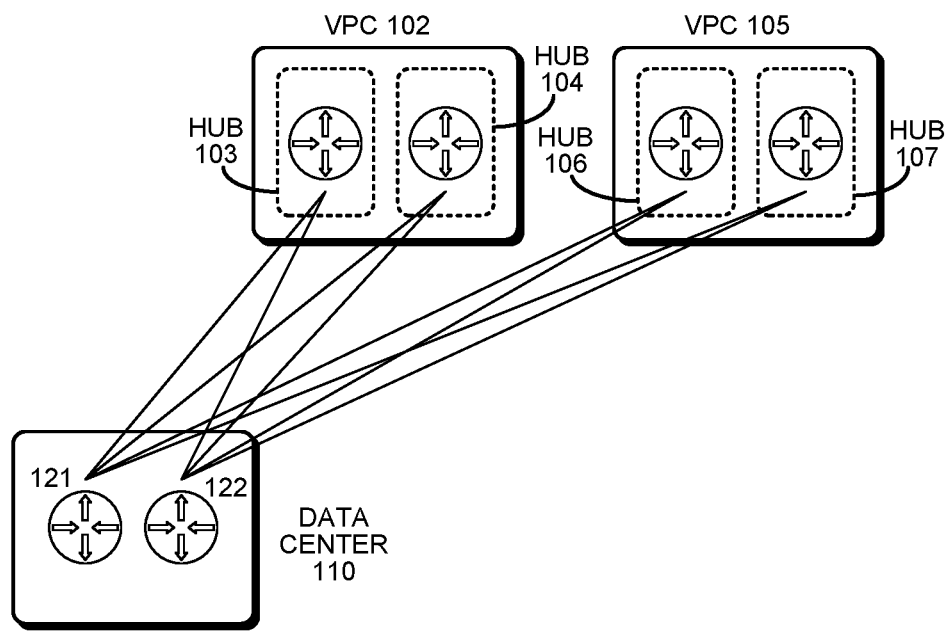
Figure 7C:
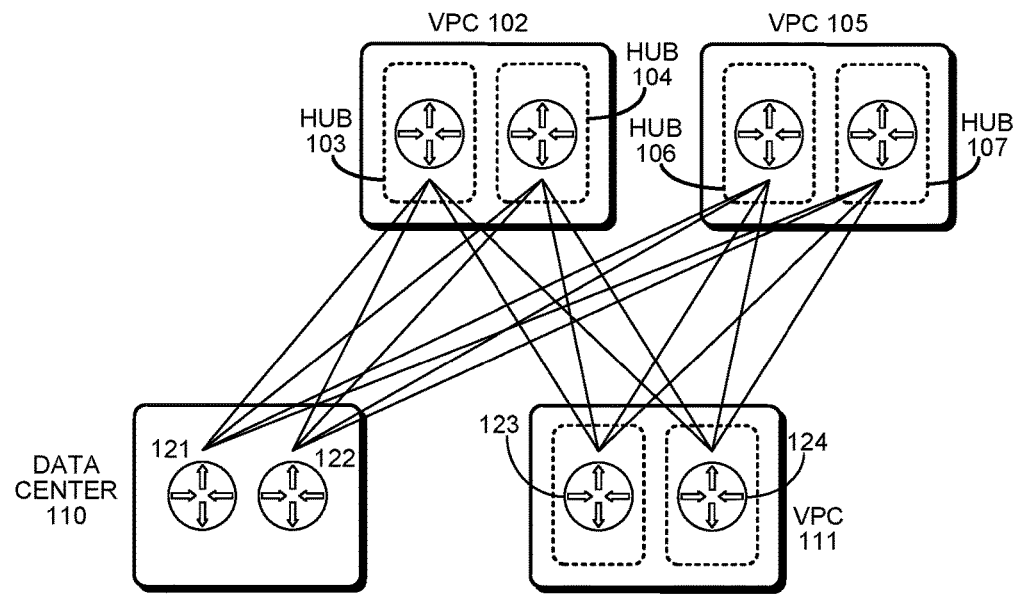
Figure 7D:
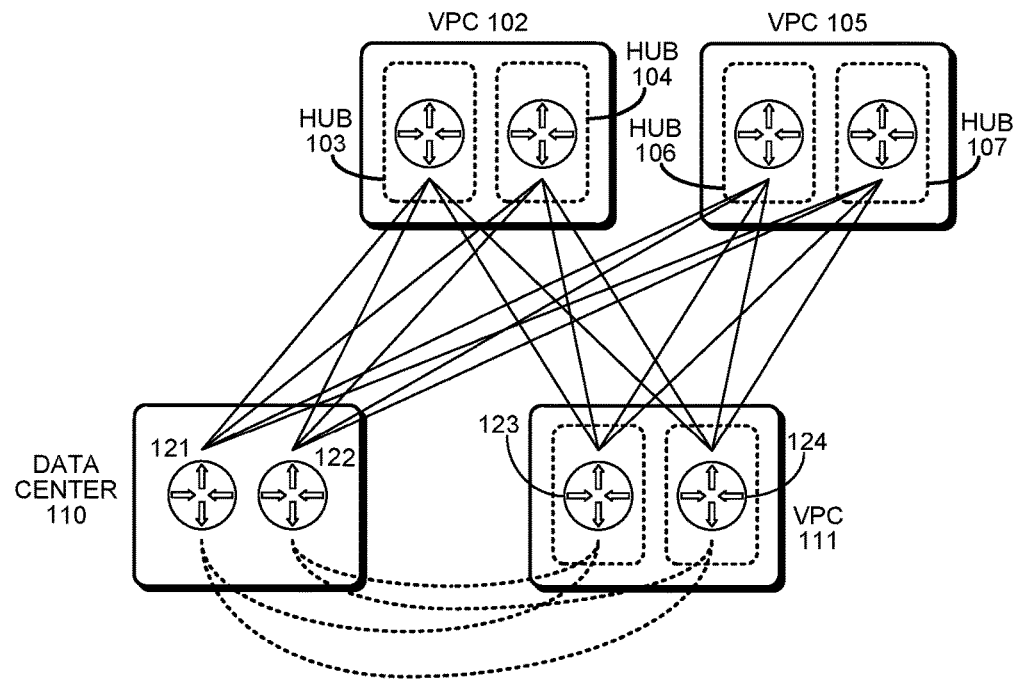

The example presented in FIGS. 7A-7E illustrates how hubs and routers are initialized and how direct connections are formed between hubs and routers in the exemplary computing environment 100 from FIG. 1 in accordance with the disclosed embodiments. As illustrated in FIG. 7A, the initial system starts with four hubs 103, 104, 106 and 107 contained within two VPCs 102 and 105. First, a new "spoke" comprising a datacenter 110 with two routers 121-122 is added to the system, and direct IPSec tunnels are established from the two routers 121-122 to the four hubs 103, 104, 106 and 107 as is illustrated in FIG. 7B. Next, a second "spoke" comprising VPC 111 with two routers 123-124 is added to the system, and direct IPSec tunnels are established from routers 123-124 to the four hubs 103, 104, 106 and 107 as is illustrated in FIG. 7C.

Then, as packets are subsequently forwarded between routers 121-122 and routers 123-124 through hubs 103, 104, 106 and 107, the hubs 103, 104, 106 and 107 send NHRP redirect messages back to the origin routers within routers 103, 104, 106 and 107. This causes IPSec tunnels to be established between routers 121-122 and 123-124 as described above, wherein these new direct IPSec tunnels are illustrated by the dashed lines that appear in FIG. 7D. These new tunnels facilitate subsequent direct spoke-to-spoke packet transfers between routers 121-122 and 123-124.

Figure 7E:
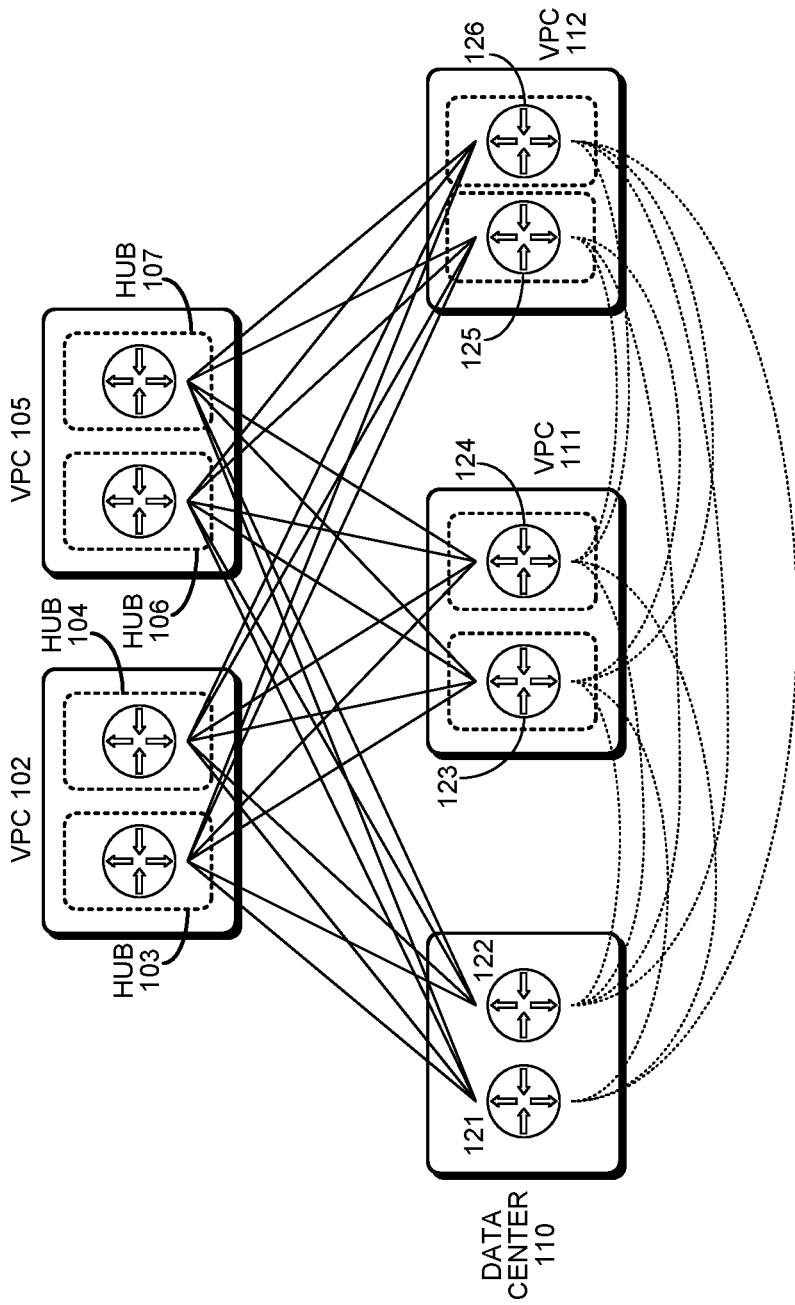

Next, a third "spoke" comprising VPC 112 with two routers 125-126 is added to the system, and direct IPSec tunnels are established from routers 125-126 to the four hubs 103, 104, 106 and 107. Then, subsequent packet forwarding operations cause direct IPSec tunnels to be established between routers 125-126 and routers 121-124. The resulting system including both spoke-to-hub and spoke-to spoke connections is illustrated in FIG. 7E.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating communication between virtual private clouds (VPCs) hosted by different cloud service providers, comprising:
   detecting a new VPC;
   initializing two router instances for the new VPC;
   building direct tunnels from the two router instances to existing dynamic multiport virtual private network (DMVPN) hubs;
   using a routing protocol to find peers for the two router instances, and to determine routes to the peers;
   injecting the routes obtained from the routing protocol into one or more routing tables for the new VPC;
   receiving a packet from a source at a first router in a first VPC, wherein the first VPC is hosted by a first cloud service provider, and wherein the packet is directed to a destination in a second VPC, which is hosted by a second cloud service provider; and
   if no direct tunnel exists between the first VPC and the second VPC,
      forwarding the packet through an intermediate hub to the second VPC, and
      automatically building a direct tunnel from the first router in the first VPC to a second router in the second VPC to facilitate subsequent communications between the first and second VPCs.

2. The method of claim 1, wherein automatically building the direct tunnel from the first VPC to the second VPC comprises automatically:
   determining a direct route from the first VPC to the second VPC; and
   injecting the direct route into a routing table in the first router.

3. The method of claim 2, wherein the operations of determining and injecting the direct route are performed by a script executing on a virtual machine located in the first VPC.

4. The method of claim 2, wherein injecting the direct route into the routing table in the first router comprises performing an application-programming interface (API) call through an API provided by the first cloud service provider to perform the injection.

5. The method of claim 1, wherein automatically building the direct tunnel comprises automatically building an encrypted Internet protocol security (IPSec) tunnel between the first router in the first VPC and the second router in the second VPC.

6. The method of claim 1, wherein the process of automatically building the direct tunnel from the first VPC to the second VPC is triggered by the intermediate hub, which sends a next-hop-resolution-protocol (NHRP) request to the first router.

7. The method of claim 1, wherein when one of the two router instances fails, the method further comprises performing a fail-over operation, which switches processes from the failed router instance to a remaining router instance.

8. The method of claim 1, wherein the routing protocol comprises the border gateway protocol (BGP).

9. The method of claim 1, wherein determining the routes to the peers additionally comprises using an equal-cost multipath (ECMP) routing mechanism to determine the routes.

10. The method of claim 1, wherein determining the routes to the peers additionally comprises using a traffic-engineering technique, which load-balances routes between the two router instances, to determine the routes.

11. The method of claim 1, wherein determining the routes to the peers additionally comprises using a Kubernetes pods routing mechanism to determine the routes.

12. A non-transitory computer-readable storage medium storing instructions that when executed by a computer cause the computer to perform a method for facilitating communication between virtual private clouds (VPCs) hosted by different cloud service providers, the method comprising:
   detecting a new VPC;
   initializing two router instances for the new VPC;
   building direct tunnels from the two router instances to existing dynamic multiport virtual private network (DMVPN) hubs;
   using a routing protocol to find peers for the two router instances, and to determine routes to the peers;
   injecting the routes obtained from the routing protocol into one or more routing tables for the new VPC:,
   receiving a packet from a source at a first router in a first VPC, wherein the first VPC is hosted by a first cloud service provider, and wherein the packet is directed to a destination in a second VPC, which is hosted by a second cloud service provider; and
   if no direct tunnel exists between the first VPC and the second VPC,
      forwarding the packet through an intermediate hub to the second VPC, and
      automatically building a direct tunnel from the first router in the first VPC to a second router in the second VPC to facilitate subsequent communications between the first and second VPCs.

13. The non-transitory computer-readable storage medium of claim 12, wherein automatically building the direct tunnel from the first VPC to the second VPC comprises automatically:
   determining a direct route from the first VPC to the second VPC; and
   injecting the direct route into a routing table in the first router.

14. The non-transitory computer-readable storage medium of claim 13, wherein the operations of determining and injecting the direct route are performed by a script executing on a virtual machine located in the first VPC.

15. The non-transitory computer-readable storage medium of claim 13, wherein injecting the direct route into the routing table in the first router comprises performing an application-programming interface (API) call through an API provided by the first cloud service provider to perform the injection.

16. The non-transitory computer-readable storage medium of claim 12, wherein automatically building the direct tunnel comprises automatically building an encrypted Internet protocol security (IPSec) tunnel between the first router in the first VPC and the second router in the second VPC.

17. The non-transitory computer-readable storage medium of claim 12, wherein the process of automatically building the direct tunnel from the first VPC to the second VPC is triggered by the intermediate hub, which sends a next-hop-resolution-protocol (NHRP) request to the first router.

18. The non-transitory computer-readable storage medium of claim 12, wherein when one of the two router instances fails, the method further comprises performing a fail-over operation, which switches processes from the failed router instance to a remaining router instance.

19. The non-transitory computer-readable storage medium of claim 12, wherein the routing protocol comprises the border gateway protocol (BGP).

20. The non-transitory computer-readable storage medium of claim 12, wherein determining the routes to the peers additionally comprises using an equal-cost multipath (ECMP) routing mechanism to determine the routes.

21. The non-transitory computer-readable storage medium of claim 12, wherein determining the routes to the peers additionally comprises using a traffic-engineering technique, which load-balances routes between the two router instances, to determine the routes.

22. The non-transitory computer-readable storage medium of claim 12, wherein determining the routes to the peers additionally comprises using a Kubernetes pods routing mechanism to determine the routes.

23. A system that facilitates communication between virtual private clouds (VPCs) hosted by different cloud service providers, comprising:
at least one processor and at least one associated memory; and
a communication mechanism that executes on the at least one processor, wherein during operation, the communication mechanism:
detects a new VPC;
initializes two router instances for the new VPC;
builds direct tunnels from the two router instances to existing dynamic multiport virtual private network (DMVPN) hubs;
uses a routing protocol to find peers for the two router instances, and to determine routes to the peers;
injects the routes obtained from the routing protocol into one or more routing tables for the new VPC;
receives a packet from a source at a first router in a first VPC, wherein the first VPC is hosted by a first cloud service provider, and wherein the packet is directed to a destination in a second VPC, which is hosted by a second cloud service provider; and
if no direct tunnel exists between the first VPC and the second VPC,
forwards the packet through an intermediate hub to the second VPC, and
automatically builds a direct tunnel from the first router in the first VPC to a second router in the second VPC to facilitate subsequent communications between the first and second VPCs.

24. The system of claim 23, wherein while automatically building the direct tunnel from the first VPC to the second VPC, the system automatically:
determines a direct route from the first VPC to the second VPC; and
injects the direct route into a routing table in the first router.

25. The system of claim 24, wherein the operations of determining and injecting the direct route are performed by a script executing on a virtual machine located in the first VPC.

26. The system of claim 24, wherein while injecting the direct route into the routing table in the first router, the system performs an application-programming interface (API) call through an API provided by the first cloud service provider to perform the injection.

27. The system of claim 23, wherein while automatically building the direct tunnel, the system automatically builds an encrypted Internet protocol security (IPSec) tunnel between the first router in the first VPC and the second router in the second VPC.

28. The system of claim 23, wherein the process of automatically building the direct tunnel from the first VPC to the second VPC is triggered by the intermediate hub, which sends a next-hop-resolution-protocol (NHRP) request to the first router.

29. The system of claim 23, wherein when one of the two router instances fails, the system performs a fail-over operation, which switches processes from the failed router instance to a remaining router instance.

30. The system of claim 23, wherein the routing protocol comprises the border gateway protocol (BGP).

31. The system of claim 23, wherein while determining the routes to the peers, the system additionally uses an equal-cost multipath (ECMP) routing mechanism to determine the routes.

32. The system of claim 23, wherein while determining the routes to the peers, the system additionally uses a traffic-engineering technique, which load-balances routes between the two router instances, to determine the routes.

33. The system of claim 23, wherein while determining the routes to the peers the system additionally uses a Kubernetes pods routing mechanism to determine the routes.

* * * * *